(12) United States Patent  
Choi

(10) Patent No.: US 9,132,776 B2  
(45) Date of Patent: Sep. 15, 2015

(54) SIDE MIRROR CONTROL SYSTEM AND METHOD FOR VEHICLE

(71) Applicant: Hyundai Motor Company, Seoul (KR)

(72) Inventor: Eun Beom Choi, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 228 days.

(21) Appl. No.: 13/863,621

(22) Filed: Apr. 16, 2013

(65) Prior Publication Data

US 2014/0160586 A1    Jun. 12, 2014

(30) Foreign Application Priority Data

Dec. 12, 2012    (KR) .................. 10-2012-0144922

(51) Int. Cl.
   *G02B 5/08*    (2006.01)
   *G02B 7/18*    (2006.01)
   *B60R 1/074*   (2006.01)

(52) U.S. Cl.
   CPC ........................................ *B60R 1/074* (2013.01)

(58) Field of Classification Search
   None
   See application file for complete search history.

(56) References Cited

U.S. PATENT DOCUMENTS

| 6,204,753 B1 * | 3/2001 | Schenk et al. ............... 340/435 |
| 6,291,905 B1 * | 9/2001 | Drummond et al. .......... 307/10.1 |
| 2008/0088960 A1 * | 4/2008 | Sim ............................. 359/877 |

FOREIGN PATENT DOCUMENTS

| JP | 2003335174 A | 11/2003 |
| JP | 2006-321467 A | 11/2006 |
| KR | 20-1999-005014 | 2/1999 |
| KR | 20-1999-0021237 | 6/1999 |
| KR | 10-0551795 | 12/2005 |

* cited by examiner

*Primary Examiner* — Jade R Chwasz  
(74) *Attorney, Agent, or Firm* — Mintz Levin Cohn Ferris Glovsky and Popeo, P.C.; Peter F. Corless

(57) ABSTRACT

A side mirror control system and method for a vehicle includes a first mirror module and driving unit driving a first side mirror on one side of the vehicle; a second mirror module and driving unit for driving a second side mirror on the other side of the vehicle; and a driver door module controlling the first mirror module and driving unit and the second mirror module and driving unit so that folding finish points of time of the first side mirror and the second side mirror are coincident with each other.

5 Claims, 2 Drawing Sheets

SIDE MIRROR CONTROL SYSTEM AND METHOD FOR VEHICLE

CROSS-REFERENCE TO RELATED APPLICATION

This application claims priority to and the benefit of Korean Patent Application No. 10-2012-0144922, filed on Dec. 12, 2012 in the Korean Intellectual Property Office, the entire contents of which are incorporated herein by reference.

BACKGROUND

1. Field of the Invention

The present invention relates to a side mirror control system and method for a vehicle, and more specifically, to a system and method for driving both side mirrors of a vehicle so as to complete folding operations at the same time, even though the side mirrors have different operating angles.

2. Description of the Related Art

In general, a vehicle has side mirrors in order to enable a driver to determine road conditions or see obstacles behind the vehicle. The side mirrors are usually mounted to protrude outwardly from a driver door and a front passenger door, respectively. The driver has to frequently keep an eye on both left and right side mirrors in order to prevent accidents due to conditions to the sides and/or rear of the vehicle on a road where he or she is driving.

Each side mirror, which is mounted so as to protrude outside from the vehicle, may have a risk of being damaged due to adjacent vehicles, other persons, or the like, for example, when parking the vehicle. According to the related art, the side mirror can be folded by hand so as to be protected when the vehicle is parked and prevent hindrance of nearby pedestrians or an adjacent vehicle. Recently, an auto folding system has been applied to the side mirror. In such a system, a driver manipulates a button for auto folding mounted on an inner trim or an instrument panel to fold the side mirror automatically, which results in improved convenience.

However, the auto folding system according to the related art may fold the left and right side mirrors at the same speed, and as a result, the points of time when they are fully folded are different from each other. That is, the vehicle is designed in consideration of a viewing angle of the driver resulting from a difference between lengths from the driver to the left and right side mirrors, such that the side mirror of the driver door side has an operating angle smaller than that of the front passenger door side. Therefore, when the left and right side mirrors are folded at the same speed, they may have different folding finish points of time, although they have the same folding start point of time.

In the above-described related art, although the difference in finish times does not affect operation of both side mirrors, it may make a bad impression of vehicle quality or reliability on drivers (customers). For example, since a function such as remote control may be used, it enables operating statuses of both side mirrors to be seen from outside, and when the folding finish times of the side mirrors of a vehicle are different from each other, customers may feel as if the vehicle has quality issues, or perhaps is not operating properly. In particular, as vehicles become more luxurious, the customer may expect that a feature such as folding side mirrors would operate so as to result in both side mirrors being folded with the same completion or finish times.

SUMMARY OF THE INVENTION

The present invention has been made in view of the above problems, and provides a side mirror control system for a vehicle to improve marketability or desirability of vehicles by enabling both side mirrors to have the same folding finish points of time regardless of operating angles thereof.

A side mirror control system for a vehicle according to an exemplary embodiment of the present invention includes a first mirror module and driving unit driving a first side mirror on one side of the vehicle, a second mirror module and driving unit for driving a second side mirror on the other side of the vehicle, and a driver door module controlling the first and second mirror module and driving unit so that folding finish points of time of the first and second side mirrors are coincident with each other, i.e., so that folding operations of the first and second side mirrors are completed at approximately the same time.

A method for controlling driving of first and second side mirrors of a vehicle can include steps of: providing a first minor module and driving unit for driving a first side mirror on one side of the vehicle, and a second mirror module and driving unit for driving a second side mirror on the other side of the vehicle; and controlling the first mirror module and driving unit and the second mirror module driving unit so that folding finish points of time of the first side mirror and the second side mirror are coincident with each other. The method may further include a step of: adjusting a folding speed of one of the first side mirror and the second side mirror in response to a difference between the folding finish times of the first and second side mirrors.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The above and other features of the invention are discussed infra.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Hereinafter, the exemplary embodiment of the present invention will be described in more detail with reference to accompanying drawings.

Figure 1:
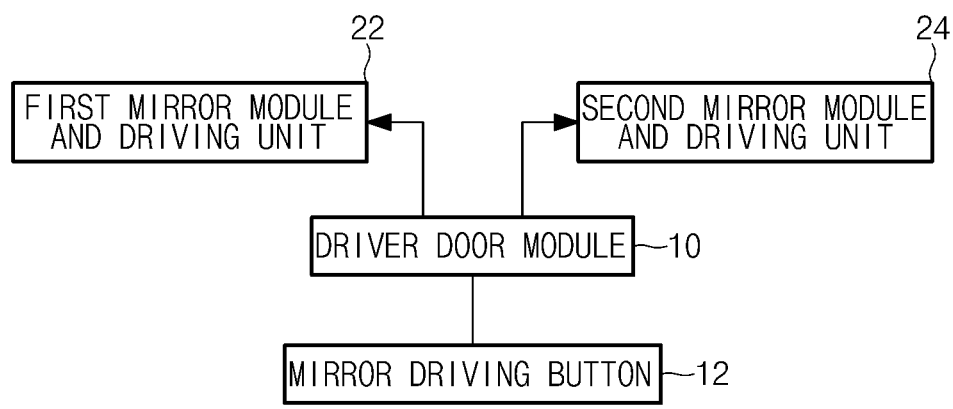
FIG. 1 is a diagram schematically showing a configuration of a side mirror control system according to an exemplary embodiment of the present invention.

FIG. 1 is a diagram schematically showing a configuration of a side mirror control system according to an exemplary embodiment of the present invention.

The side mirror control system according to the exemplary embodiment of the present invention includes a driver door module 10, a first mirror module and driving unit 22, and a second mirror module and driving unit 24.

The driver door module 10 performs control on door actuators, folding and unfolding controls on side mirrors, storage of position information on the side mirrors, controls on power-windows, and/or other vehicle functions. Particularly, when the driver door module 10 according to the present invention receives from a mirror driving button 12 an instruction to drive the side mirrors, the driver door module 10 may compute folding finish times of the left and right side mirrors, respectively. As used herein, the term "folding finish time" refers to a time that it takes a side mirror in an unfolded state to move into a completely folded state. Preferably each side mirror is folded from its current position in the same condition (i.e., having substantially the same folding speed), and then the computed folding finish times are compared to each other. If a result of the comparison shows that the two folding finish times are different from each other, that is, the folding finish points of time are different from each other, then the folding speed of one of the left and right side mirrors may be adjusted such that the folding finish times of the left and right side mirrors substantially coincide with each other.

For example, the driver door module 10 adjusts a duty value of a mirror driving signal of the side mirror of the front passenger door side by the time difference between folding finish times of the left and right side mirrors based on a duty value of a driving control signal for controlling the drive of the side mirror of the driver door side, for example, a PWM (Pulse Width Modulation) signal, and then outputs a drive control signal having the adjusted duty value to the second mirror module and driving unit 24. Here, the driver door module 10 outputs the driving control signal having a preset duty value (initial duty value) to the first mirror module and driving unit 22.

The first mirror module and driving unit 22 drives a motor (not shown) according to the driving control signal (first driving control signal) from the driver door module 10 to fold the side mirror of the driver door side.

The second mirror module and driving unit 24 drives a motor (not shown) according to the driving control signal (second driving control signal) from the driver door module 10 to fold the side mirror of the front passenger door side.

Figure 2:
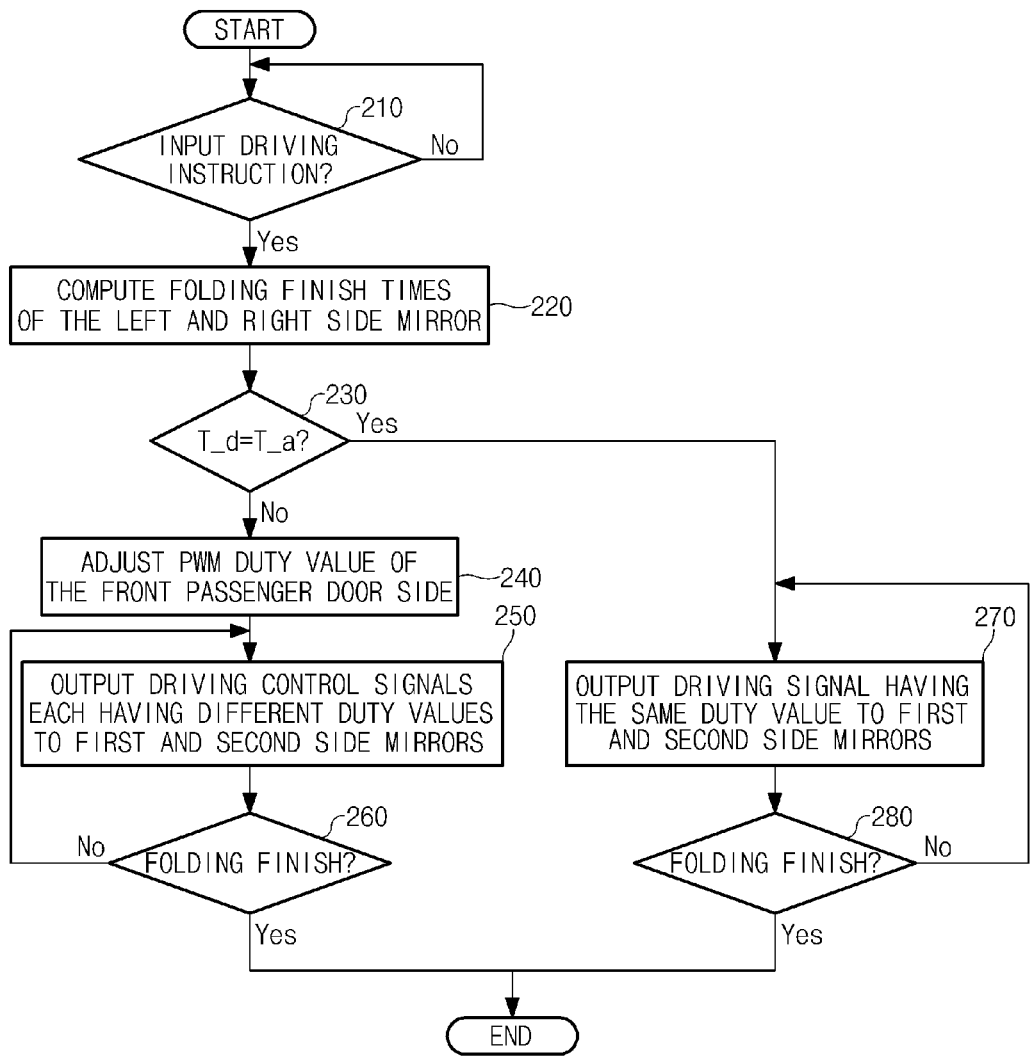
FIG. 2 is a flow chart using a control method of the side mirror control system having the configuration of FIG. 1.

FIG. 2 is a flow chart explaining a control method of the side mirror control system using the configuration of FIG. 1.

When a driver gets into a vehicle and pushes a mirror driving button 12, the mirror driving button 12 outputs a mirror driving instruction for folding side mirrors to a driver door module 10 (step 210). Alternatively, the step of pushing the mirror driving button 12 can be performed remotely, e.g., by pressing an appropriate button on a remote control device.

When the driver door module 10 receives the mirror driving instruction from the driving button 12, the driver door module 10 uses pre-stored position information of the left and right side mirrors and an initially-set duty value of the driving control signal to compute each of the times required to finish folding of the left and right side mirrors (folding finish times) in the same condition (same folding speed) (step 220).

That is, the driver door module 10 uses revolution speeds of the motors according to the duty values of the driving control signals and moving (rotation) distances of the side mirrors from the current positions to folding finish positions, and computes each folding finish time of the side mirrors of the driver door side and front passenger door side.

Here, the initial duty value may be set in a development stage of the vehicle and be stored in advance.

The driver door module 10 compares the folding finish times T_d of the driver door side and T_a of the front passenger door side which are computed at step 220 to each other to determine whether the two folding finish times are identical, that is, the folding finish points of time of the two side mirrors are coincident with each other (step 230).

If the determination result shows that the two folding finish times T_d and T_a are different from each other, the driver door module 10 adjusts the duty value of the driving control signal (PWM signal) in order to control any side mirror (e.g., front passenger side) (step 240).

For example, the operating angle of the side mirror of the front passenger door side is usually smaller than that of the side mirror of the driver door side, and therefore the side mirror of the front passenger side is first folded when the folding are started in the same condition. In particular, the folding finish time of the front passenger door side is shorter than that of the driver door side. Therefore, the driver door module 10 evaluates the time difference between the folding finish times of the side mirrors of the driver door side and the front passenger door side, which are computed at step 220, and then calculate a new duty value from a PWM signal of the side mirror of the front passenger door side to update the previous duty value with the newly calculated duty value in order to delay the folding finish time of the side mirror of the front passenger side by the time difference. In particular, the driver door module 10 makes the folding speed of the side mirror of the front passenger door side slower than that of the side mirror of the driver door side.

On the other hand, the duty value of the side mirror of the driver door side may be adjusted so that the folding finish time of the side mirror of the driver door side may get shorted by the time difference, that is, the folding speed of the side mirror of the driver door side may be increased.

Here, in the case in which the computed duty value is out of a reference range, for example, the duty value is abnormally calculated due to obstacles, the initially-set duty value is used.

To this end, the driver door module 10 sets a maximum duty value and a minimum duty value to define a reference range, and use an initial duty value in the case in which the calculated duty value deviates the reference range. The maximum duty value and the minimum duty value may be set in a development stage of the vehicle and be stored in advance.

Next, the driver door module 10 outputs the driving control signal having an initially-set duty value to the first mirror module and driving unit 22 operating the side mirror of the driver door side and the driving control signal having a newly adjusted duty value to the second minor module and driving unit 24 operating the side mirror of the front passenger door side (step 250).

In particular, the driver door module 10 respectively outputs driving control signals each having different duty values to the first mirror module and driving unit 22 and the second mirror module and driving unit 24, and differently adjusts the folding speeds of the side mirrors of the driver door side and the front passenger side, such that the folding finish points of time of the side mirrors are coincident with each other.

The driving control signal is outputted until the folding is finished (step 260).

If, at step 230, the folding finish time T_d of the side mirror of the driver door side and the folding finish time T_a of the side mirror of the front passenger side are not coincident with each other, the driver door module 10 outputs the driving control signal having the same duty value to the first mirror module and driving unit 22 and the second mirror module and driving unit 24 (step 270).

The driving control signal is outputted until the folding is finished (step 280).

As set forth, the mirror control system for a vehicle according to the present invention enables the side mirrors to have the same folding finish point of time regardless of operating angles thereof, thereby making it possible to improve marketability of the vehicle.

A method for controlling driving of first and second side mirrors of a vehicle can include steps of: providing a first minor module and driving unit for driving a first side mirror on one side of the vehicle, and a second mirror module and driving unit for driving a second side mirror on the other side of the vehicle; and controlling the first mirror module and driving unit and the second mirror module driving unit so that folding finish points of time of the first side mirror and the second side mirror are coincident with each other. The method may further include a step of: adjusting a folding speed of one of the first side mirror and the second side mirror in response to a difference between the folding finish times of the first and second side mirrors.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A side mirror control system for vehicle comprising:
    a first mirror module and driving unit for driving a first side mirror on one side of the vehicle;
    a second mirror module and driving unit for driving a second side mirror on the other side of the vehicle; and
    a driver door module controlling the first mirror module and driving unit and the second mirror module driving unit so that folding finish points of time of the first side mirror and the second side mirror are coincident with each other,
    wherein, when the driver door modules receives an instructor for driving one of the first and second side mirrors, the driver door module computes the folding finish times of the first and second side mirrors, respectively, when folding each of the first and second mirrors from its current position at a same speed, and then compares the computed folding finish times and when the folding finish times of the first side mirror and the second side mirror are different from each other, the driver door module adjust a folding speed of one of the first side mirror and the second side mirror in response to a difference between the folding finish times of the first and second side mirrors.

2. The side mirror control system for vehicle of claim 1, wherein the driver door module delays the folding speed of one of the first and second side mirrors having a smaller operating angle among the first side mirror and the second side mirror.

3. The side mirror control system for vehicle of claim 1, wherein the driver door module increases the folding speed of one of the first and second side mirrors having a larger operating angle among the first side mirror and the second side mirror.

4. The side mirror control system for vehicle of claim 1, wherein the driver door module adjusts a duty value of a pulse-width modulation (PWM) signal for controlling an operation of the first mirror module and driving unit or the second mirror module and driving unit.

5. A method for controlling driving of first and second side mirrors of a vehicle, the method comprising:
    providing a first mirror module and driving unit for driving a first side mirror on one side of the vehicle, and a second mirror module and driving unit for driving a second side mirror on the other side of the vehicle;
    controlling the first mirror module and driving unit and the second mirror module driving unit so that folding finish points of time of the first side mirror and the second side mirror are coincident with each other;
    receiving via the driver door module an instruction for driving one of the first and second side mirrors, the driver door module computes the folding finish times of the first and second side mirrors, respectively, when folding each of the first and second side mirrors from its current position at a same speed; and
    comparing the computed folding finish times and when the folding finish times of the first side mirror and the second side mirror are different from each other, the driver door module adjusts a folding speed of one of the first side mirror and the second side mirror in response to a difference between the folding finish times of the first and second side mirrors.

* * * * *